(12) United States Patent  
Doerr

(10) Patent No.: US 6,504,970 B2  
(45) Date of Patent: Jan. 7, 2003

(54) PLANAR LIGHTWAVE WAVELENGTH BLOCKER

(75) Inventor: Christopher Richard Doerr, Middletown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 34 days.

(21) Appl. No.: 09/809,124

(22) Filed: Mar. 15, 2001

(65) Prior Publication Data

US 2002/0131684 A1 Sep. 19, 2002

(51) Int. Cl.$^7$ .................................................. G02B 6/28
(52) U.S. Cl. ............................ 385/24; 385/46; 359/124
(58) Field of Search ............................... 385/16–24, 32, 385/33, 37, 45, 46; 359/130, 124, 127

(56) References Cited

U.S. PATENT DOCUMENTS 6,148,124 A * 11/2000 Aksyuk et al. ................ 385/24  
6,351,581 B1 * 2/2002 Doerr et al. ................... 385/24

OTHER PUBLICATIONS

Wilfong et. al., "WDM Cross–Connect Architectures with Reduced Complexity," Journal of Lightwave Technology, vol. 17, No. 10, 1732–1741 (Oct., 1999).

Doerr et al., "2 X 2 Wavelength–Selective Cross Connect Capable of Switching 128 Channels in Sets of Eight," IEEE Photonics Technology Letters, vol. 14, No. 3, 387–389 (Mar., 2002).

* cited by examiner

*Primary Examiner*—Phan T. H. Palmer  
(74) *Attorney, Agent, or Firm*—Ryan, Mason & Lewis, LLP

(57) ABSTRACT

A method and apparatus are disclosed for filtering an input wavelength-division multiplexed (WDM) signal comprised of N wavelength channels. The disclosed wavelength blocker includes a demultiplexer for producing a plurality of demultiplexed output signals from the input WDM signal and a multiplexer for producing an output WDM signal. A shutter array selectively passes each of the N wavelength channels using a plurality of shutters. The demultiplexer is coupled to the multiplexer using a plurality of waveguides having approximately equal length, in order to reduce multipath interference. Each of the N wavelength channels are selectively passed or blocked using a thermo-optic or electro-optic control signal to control the state of the corresponding shutter. Crosstalk can be reduced using dilation techniques that position two shutters in series, especially where the shutters are thermo-optic Mach-Zehnder switches. Wavelength-selective cross connects and wavelength adddrop multiplexers are also disclosed that employ the novel wavelength blockers.

21 Claims, 3 Drawing Sheets

PLANAR LIGHTWAVE WAVELENGTH BLOCKER

FIELD OF THE INVENTION

The present invention relates to optical communication networks and, more particularly, to optical devices for routing multi-wavelength optical signals.

BACKGROUND OF THE INVENTION

When multiple users share a transmission medium, some form of multiplexing is required to provide separable user sub-channels. There are many multiplexing techniques available that simultaneously transmit information signals within the available bandwidth, while still maintaining the quality and intelligibility that are required for a given application. Optical communication systems, for example, increasingly employ wavelength division multiplexing (WDM) techniques to transmit multiple information signals on the same fiber, and differentiate each user sub-channel by modulating it with a unique wavelength of invisible light. WDM techniques are being used to meet the increasing demands for increasing speed and bandwidth in optical transmission applications.

In optical communication networks, such as those employing WDM techniques, individual optical signals are often selectively routed to different destinations. Thus, a high capacity matrix or cross-connect switch is often employed to selectively route signals through interconnected nodes in a communication network. Many cross-connect switches used in optical communication networks are either manual or electronic, requiring multiple optical-to-electrical and electrical-to-optical conversions. The speed and bandwidth advantages associated with transmitting information in optical form, however, makes an all-optical network the preferred solution for WDM-based optical networks. Moreover, all-optical network elements are needed to provide the flexibility for managing bandwidth at the optical layer (e.g., on a wavelength by wavelength basis). In addition, it is often desirable to remove light of a given wavelength from a fiber or add light of a given wavelength to the fiber. A device that provides this feature is often referred to as a wavelength add-drop (WAD) multiplexer.

Wavelength blockers are optical devices that accept an incoming signal of multiple wavelength channels and independently pass or block each wavelength channel. Wavelength blockers can be used as components in a larger optical communication system, for example, to route a given optical signal along a desired path between a source and destination. Optical cross-connect switches and wavelength add-drop multiplexers, for example, could be implemented using wavelength blockers. A wavelength blocker provides a number of desirable features. First, a network element using wavelength blockers is modular and thus scalable and repairable. Second, network elements using wavelength blockers have a multicasting capability. Third, wavelength blockers are relatively easy to manufacture with high performance. For example, wavelength blockers have only two fiber connections, and it is possible to use a polarization diversity scheme to make them polarization independent.

As the demand for optical bandwidth increases in WDM communication systems, it is desirable to increase the number of channels. Unfortunately, an increase in the number of channels provides a corresponding increase in the size, cost and insertion loss of the optical devices in such WDM communication systems. A need therefore exists for improved wavelength blockers that permit optical cross-connect switches, wavelength add-drop multiplexers and other optical devices to be fabricated with reduced size and cost. A further need exists for two-port wavelength blockers that permit optical cross-connect switches and wavelength add-drop multiplexers to be configured without complex waveguide crossings. Yet another need exists for improved wavelength blockers having a frequency spectrum with a generally flat transmission spectrum in both amplitude and phase.

SUMMARY OF THE INVENTION

Generally, a method and apparatus are disclosed for filtering an input wavelength-division multiplexed (WDM) signal comprised of N wavelength channels. The disclosed wavelength blocker includes a demultiplexer for producing a plurality of demultiplexed output signals from the input WDM signal and a multiplexer for producing an output WDM signal. In addition, a shutter array selectively passes each of the N wavelength channels using a plurality of shutters. According to one aspect of the invention, the demultiplexer is coupled to the multiplexer using a plurality of waveguides having approximately equal length, in order to reduce multipath interference.

The shutters may be embodied, for example, as Mach-Zehnder switches, electro-absorption modulators or Y-branch switches. Each of the N wavelength channels in the incoming signal are selectively passed or blocked using a thermo-optic or electro-optic control signal to control the state of the corresponding shutter. According to another aspect of the invention, crosstalk among the various N channels can be reduced using dilation techniques that position two shutters in series, especially where the shutters are thermo-optic Mach-Zehnder switches. The disclosed wavelength blockers may be utilized in wavelength-selective cross connects and wavelength add-drop multiplexers, as well as other optical devices.

A more complete understanding of the present invention, as well as further features and advantages of the present invention, will be obtained by reference to the following detailed description and drawings.

DETAILED DESCRIPTION

Figure 1:
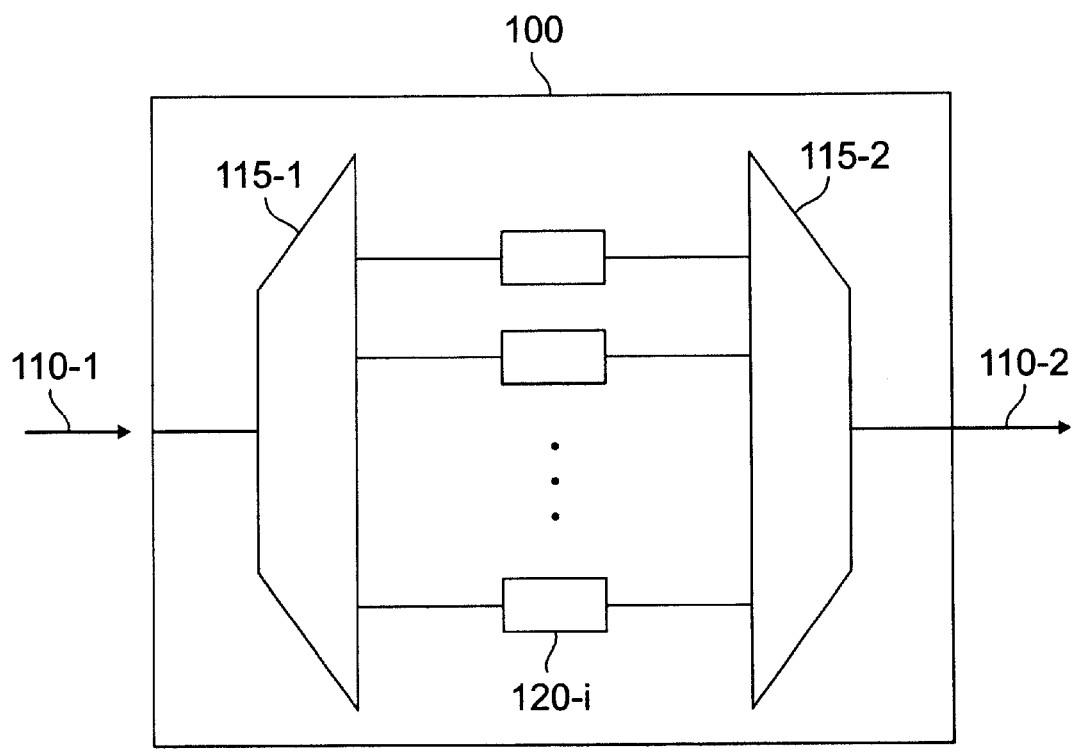
FIG. 1 illustrates a conventional wavelength blocker.

FIG. 1 illustrates a conventional wavelength blocker 100. As shown in FIG. 1, a wavelength blocker 100 is an optical device having two ports 110-1, 110-2 that accept an incoming signal of multiple wavelength channels at a first port 110-1 and independently pass or block each wavelength channel, i, to a second port 110-2. A demultiplexer 115-1 separates the incoming signal into each component wavelength channel, i, which is then selectively passed or blocked by the corresponding shutter 120-i (or variable optical attenuators) to a multiplexer 115-2.

Figure 2:
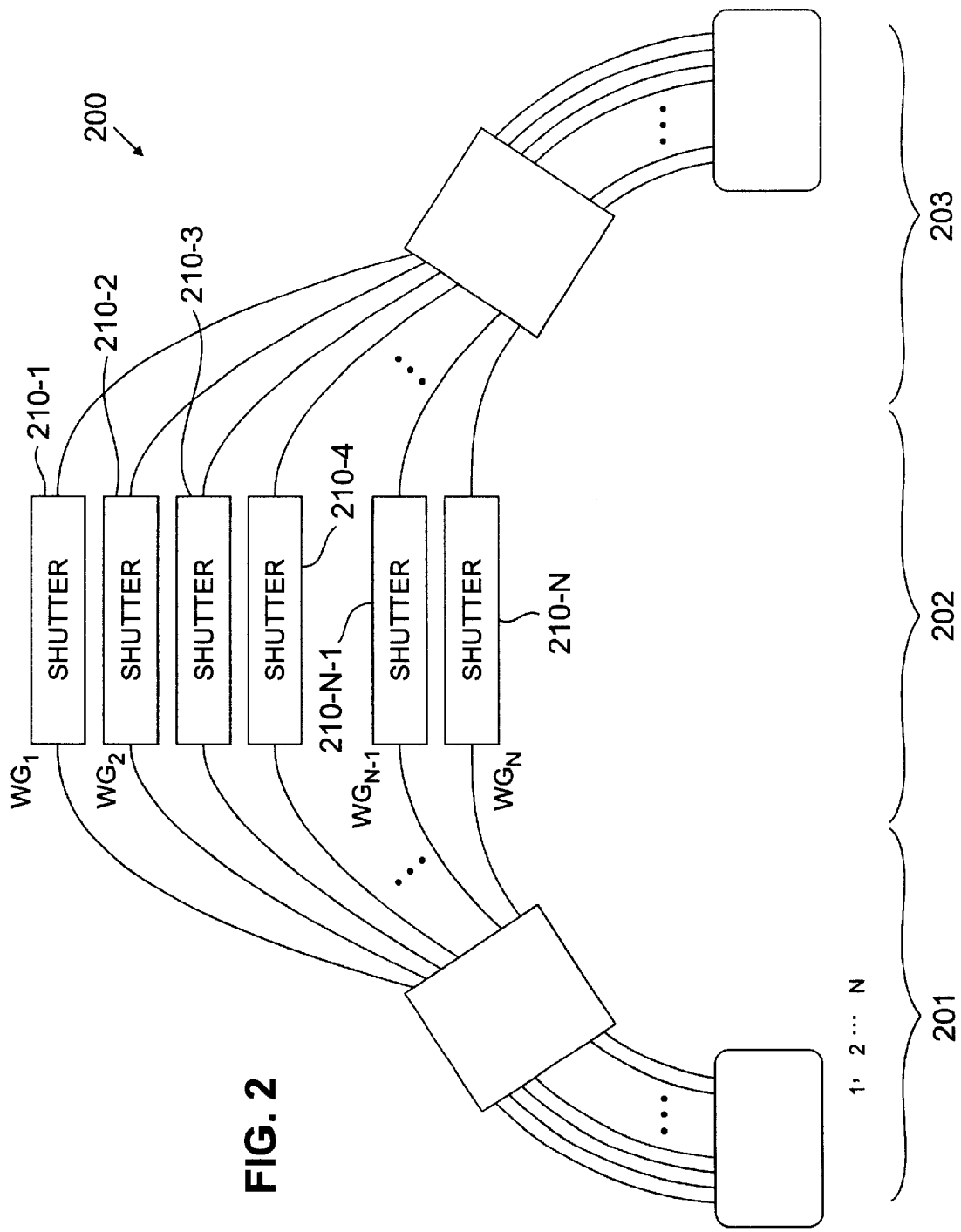
FIG. 2 illustrates a conventional wavelength blocker in accordance with the present invention.

FIG. 2 illustrates a wavelength blocker 200 in accordance with the present invention. As shown in FIG. 2, the wavelength blocker 200 is comprised of a demultiplexer 201, a waveguide lens 202 and a multiplexer 203. The waveguide lens 202 is comprised of a number of equal-length waveguides, $WG_1$ through $WG_N$, each associated with a corresponding shutter 210-1 through 210-N (hereinafter, collectively referred to as shutters 210). In order to reduce multipath interference, the waveguides, $WG_1$ through $WG_N$, have approximately the same length, for example, using a constant bend radius and have equal straight and bend lengths independently, resulting in adjacent lens arms having nearly exactly the same phase. Thus, no post-trimming should be required. Typically, adjacent lens arms should have an equal length to within a small integer multiple of the corresponding wavelength, $\lambda_i$. It is noted that since crosstalk is strongest among adjacent waveguides, it is most important that neighboring waveguides have approximately the same length, but that waveguides far separated from each other by other waveguides could have substantially different path lengths.

The shutters 210 may be embodied as one or more Mach-Zehnder switches or Mach-Zehnder interferometer shutters, such as those described in M. Okuno et al., "Silica-Based Thermo-Optic Switches," NTT Review, Vol. 7, No. 5 (September 1995), each incorporated by reference herein. In addition, the shutters 210-N may be embodied as, e.g., electro-absorption modulators or Y-branch switches. The demultiplexer 201 and multiplexer 203 can be embodied as planar waveguide gratings. It is noted that the waveguide gratings for the demultiplexer 201 and multiplexer 203 need not be the same.

In order to selectively pass or block the incoming signal, the shutters 210 are controlled by a thermo-optic or electro-optic control signal (not shown), as appropriate for the selected shutter 210. If the shutters 210 are thermo-optic Mach-Zehnder switches, or if crosstalk is otherwise a problem, each lens arm, $WG_1$ through $WG_N$, should contain two switches in series, i.e., use switch dilation, resulting in reduced crosstalk, but a doubling of the electrical power consumption.

The exemplary wavelength blocker 200 handles 40 channels with 100-GHz channel spacing. According to another feature of the wavelength blocker 200, each wavelength channel from the demultiplixer 201 is optionally carried by two or more equal-length waveguides. Thus, the wavelength blocker 200 includes two or more lens arms (equal-length waveguides) per channel. The two dilated Mach-Zehnder switches 210 associated with the two equal-length waveguides carrying the same demultiplixer output signal work in concert to pass or block the demultiplixer output signal. For a more detailed discussion of this multiple equal-length waveguides per signal arrangement, see U.S. patent application Ser. No. 09/798,501, filed Mar. 2, 2001, entitled "A Wavelength Filter That Operates On Sets of Wavelength Channels," incorporated by reference herein. Among other benefits, this multiple equal-length waveguides per signal arrangement provides individual passbands having a flat frequency spectrum for each channel and the entire response is completely flat when no channels are dropped or added.

The wavelength blocker 200 can be quite compact. It can be shown that the exemplary wavelength blocker 200 has a resulting length of about 9.5 cm in typical silica waveguides and allows for five such devices per five-inch-diameter wafer.

The present invention recognizes that a wavelength blocker 200 does not need to give access to the dropped channels. Thus, the wavelength blocker 200 in accordance with the present invention employs a transmissive design with evenly distributed lens arms, as shown in FIG. 2. It is noted that prior techniques configured the waveguide lens in a reflective fashion in order to access the drop channels. See, C. R. Doerr et al., "40-Wavelength Add-Drop Filter," IEEE Photon. Technol. Lett., Vol. 11, 1437–1439 (1999). When configured in a reflective fashion, the polishing angle and flatness of the reflective facet is generally inaccurate enough to cause large phase differences between adjacent lens arms. In addition, the lens waveguides of a reflective wavelength blocker are arranged in pairs, in order to give room for the waveguides containing the drop channels to reach the facet between the mirror stripes that reflect back the lens waveguides for the express channels, making the environments for adjacent lens waveguides different, resulting in different birefringences for each lens arm. Also, most likely because the waveguide core sidewalls are typically somewhat slanted, there is polarization conversion in the bends and adjacent lens arms curve in different directions at certain points. Thus, the polarization dependence of the reflective grating-lens-grating is generally more than 1 dB, making it unusable for most long-haul systems.

The polarization dependence of the wavelength blocker 200 is small. If the polarization dependence is not low enough, however, one can employ a polarization diversity scheme using a polarization splitter and circulator, such as the polarization diversity scheme described in C. R. Doerr et al., "An Automatic 40-Wavelength Channelized Equalizer," IEEE Photon. Technol. Lett., Vol. 12, 1195–1197 (2000), incorporated by reference herein, since the wavelength blocker is a two-port reciprocal device.

Figure 3:
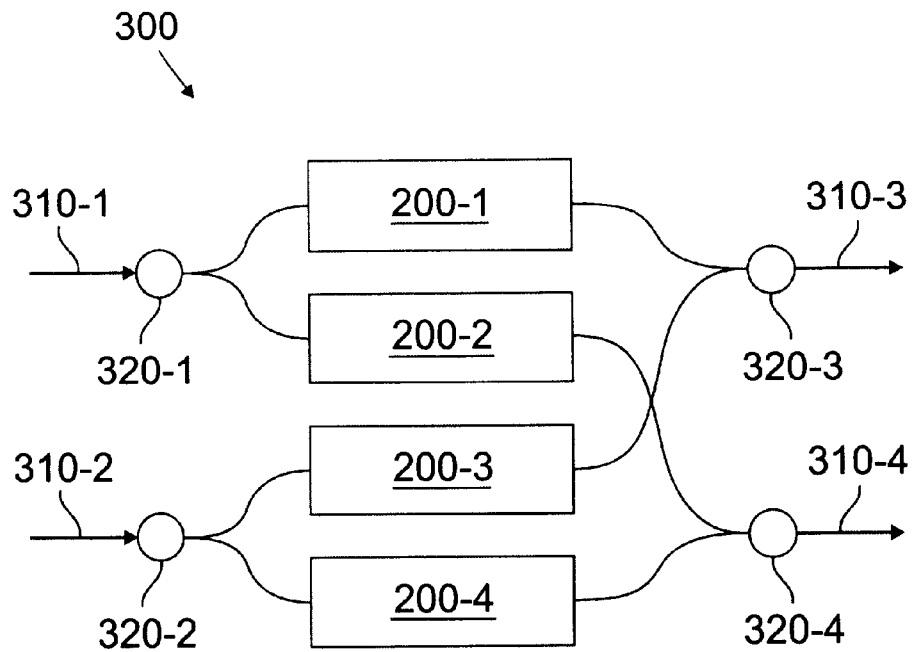
FIG. 3 illustrates a wavelength-selective cross connect (WSC) in accordance with the present invention.

FIG. 3 illustrates a wavelength-selective cross connect (WSC) 300 in accordance with the present invention. The wavelength-selective cross connect 300 may be used, for example, in a communication system having multiple fiber rings. As shown in FIG. 3, the wavelength-selective cross connect 300 is an optical device having two input ports 310-1 and 310-2 and two output ports 310-3 and 310-4. An incoming signal received on a given incoming port 310-1 and 310-2 is selectively (i) passed to the corresponding output port 310-3 or 310-4, respectively, in a bar state; or (ii) crossed to the opposite output port 310-4 or 310-3, respectively, in a cross state. The wavelength-selective cross connect 300 consists of four wavelength blockers 200-1 through 200-4, which may each be embodied as the wavelength blocker 200 discussed above in conjunction with FIG. 2.

In addition, the wavelength-selective cross connect 300 of FIG. 3 includes two power splitters 320-1 and 320-2 and two power combiners 320-3 and 320-4. The power splitters 320-1 and 320-2 divide the power of an incoming signal in half and the half-power signals are applied to two corresponding wavelength blockers 200, as shown in FIG. 3. Likewise, each power combiner 320-3 and 320-4 combines the power at the output of two alternating wavelength blockers 330, as shown in FIG. 3. In this manner, the wavelength-selective cross connect 300 can selectively pass or cross an incoming signal to an appropriate output port, as desired.

Figure 4:
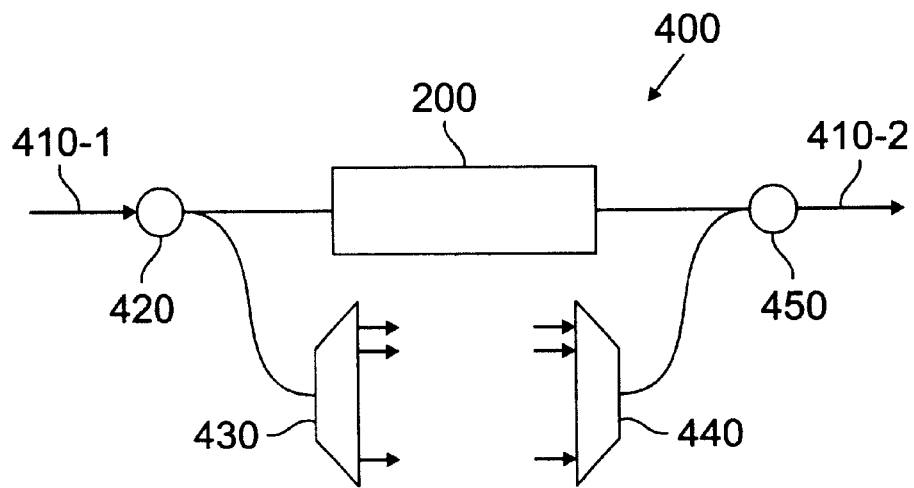
FIG. 4 illustrates a wavelength add-drop (WAD) multiplexer in accordance with the present invention.

FIG. 4 illustrates a wavelength add-drop (WAD) multiplexer 400 in accordance with the present invention. The wavelength add-drop multiplexer 400 is an optical device having two ports 410-1 and 410-2. An incoming signal of multiple wavelength channels is accepted at a first port 410-1 and applied to a power splitter 420. The half-power signal is then applied in parallel to a wavelength blocker 200 and a demultiplexer 430. Individual wavelength channels are then either passed by the wavelength blocker 200 or selectively dropped by the demultiplexer 430 to a local destination. In addition, individual wavelength channels are selectively added by a multiplexer 440 in cooperation with the wavelength blocker 200. The outputs of the wavelength blocker 200 and the multiplexer 440 are combined by a power combiner 450 before being applied to the second port 410-2.

When used as a wavelength add-drop multiplexer 400, the wavelength blocker 200 must impair the express channels as little as possible (express channels pass through the WAD 400, including the wavelength blocker 200, without being blocked). In other words, the transmission spectrum of the wavelength blocker 200 must be as flat as possible in both amplitude and phase. As previously indicated, this can be accomplished in accordance with one aspect of the present invention by having all of the path lengths connecting the multplexer and demultiplexer pair 201, 203 be the same length, to within a few wavelengths, and ensuring that the shutter 202 connections to the grating 201, 203 do not undersample the optical spectrum. However, also as mentioned previously, it is most important that adjacent waveguides have the same path length, and waveguides far separated from each other by several waveguides could have substantially different path lengths.

It is to be understood that the embodiments and variations shown and described herein are merely illustrative of the principles of this invention and that various modifications may be implemented by those skilled in the art without departing from the scope and spirit of the invention.

I claim:

1. An optical device for filtering an input wavelength-division multiplexed (WDM) signal comprising N wavelength channels, the optical device comprising:
   a demultiplexer for producing a plurality of demultiplexed output signals from said input WDM signal;
   a multiplexer for producing an output WDM signal; and
   a shutter array having a plurality of shutters for coupling said demultiplexer to said multiplexer using a plurality of waveguides, wherein adjacent waveguides have approximately equal length, wherein said plurality of shutters selectively passes said N wavelength channels.

2. The optical device according to claim 1, wherein said plurality of shutters are embodied as Mach-Zehnder switches.

3. The optical device according to claim 1, wherein said plurality of shutters are embodied as electro-absorption modulators.

4. The optical device according to claim 1, wherein said plurality of shutters are embodied as Y-branch switches.

5. The optical device according to claim 1, wherein said plurality of shutters are controlled by a thermo-optic effect.

6. The optical device according to claim 1, wherein said plurality of shutters are controlled by an electro-optic effect.

7. The optical device according to claim 1, wherein a plurality of said waveguides carry each of said N wavelength channels.

8. The optical device according to claim 1, wherein a plurality of said shutters are associated in series with each of said plurality of waveguides.

9. The optical device according to claim 1, further comprising a polarization diversity scheme.

10. An optical device for filtering an input wavelength-division multiplexed (WDM) signal comprising N wavelength channels, the optical device comprising:
    a demultiplexer for producing a plurality of demultiplexed output signals from said input WDM signal;
    a multiplexer for producing an output WDM signal; and
    a plurality of Mach-Zehnder switches for selectively passing said N wavelength channels, said plurality of Mach-Zehnder switches coupling said demultiplexer to said multiplexer using a plurality of waveguides, wherein adjacent waveguides have approximately equal length.

11. The optical device according to claim 10, wherein said plurality of Mach-Zehnder switches are controlled by a thermo-optic effect.

12. The optical device according to claim 10, wherein said plurality of Mach-Zehnder switches are controlled by an electro-optic effect.

13. The optical device according to claim 10, wherein a plurality of said waveguides carry each of said N wavelength channels.

14. The optical device according to claim 10, wherein a plurality of said shutters are associated in series with each of said plurality of waveguides.

15. A method for filtering an input wavelength-division multiplexed (WDM) signal comprising N wavelength channels, said method comprising the steps of:
    producing a plurality of demultiplexed output signals from said input WDM signal using a demultiplexer;
    producing an output WDM signal using a multiplexer;
    selectively passing said N wavelength channels using a shutter array having a plurality of shutters; and
    coupling said demultiplexer to said multiplexer using a plurality of waveguides, wherein adjacent waveguides have approximately equal length.

16. The method according to claim 15, wherein said plurality of shutters are embodied as Mach-Zehnder switches.

17. The method according to claim 15, further comprising the step of controlling said plurality of shutters using a thermo-optic effect.

18. The method according to claim 15, further comprising the step of controlling said plurality of shutters using an electro-optic effect.

19. The method according to claim 15, further comprising the step of employing a polarization diversity scheme.

20. A wavelength-selective cross connect (WSC) having a plurality of input ports and output ports for selectively passing or crossing an incoming signal received on one of said input ports to a corresponding output port or to an opposite output port, said WSC comprising:
- at least four optical devices for filtering said incoming signal, said at least four optical devices comprising:
  - a demultiplexer for producing a plurality of demultiplexed output signals from said incoming signal;
  - a multiplexer for producing an output signal; and
  - a shutter array having a plurality of shutters for coupling said demultiplexer to said multiplexer using a plurality of waveguides, wherein adjacent waveguides have approximately equal length, wherein said plurality of shutters selectively passes said incoming signal.

21. A wavelength add-drop (WAD) multiplexer having an input port and an output port for selectively removing or adding light of a given wavelength to an optical signal comprising N wavelength channels, said WAD comprising:
- a dropping demultiplexer for producing a plurality of demultiplexed output signals from said optical signal;
- an adding multiplexer for producing an output optical signal; and
- a wavelength blocker, said wavelength blocker comprising:
  - a demultiplexer for producing a plurality of demultiplexed output signals from said optical signal;
  - a multiplexer for producing an output optical signal; and
  - a shutter array having a plurality of shutters for coupling said demultiplexer to said multiplexer using a plurality of waveguides, wherein adjacent waveguides have approximately equal length, wherein said plurality of shutters selectively passes said N wavelength channels.

* * * * *